United States Patent
Fischer et al.

(10) Patent No.: US 10,391,804 B2
(45) Date of Patent: Aug. 27, 2019

(54) SECURITY PRODUCT OR VALUABLE PRODUCT HAVING AN ELECTROLUMINESCENT SECURITY ELEMENT AND METHOD FOR THE PRODUCTION THEREOF

(71) Applicant: BUNDESDRUCKEREI GmbH, Berlin (DE)

(72) Inventors: Joerg Fischer, Berlin (DE); Markus Tietke, Berlin (DE); Manfred Paeschke, Wandlitz (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 38 days.

(21) Appl. No.: 14/785,734

(22) PCT Filed: Apr. 29, 2014

(86) PCT No.: PCT/EP2014/058728
§ 371 (c)(1),
(2) Date: Oct. 20, 2015

(87) PCT Pub. No.: WO2014/177564
PCT Pub. Date: Nov. 6, 2014

(65) Prior Publication Data
US 2016/0068005 A1    Mar. 10, 2016

(30) Foreign Application Priority Data
May 2, 2013    (DE) .................. 10 2013 207 998

(51) Int. Cl.
*B42D 25/36*    (2014.01)
*B42D 25/45*    (2014.01)
(Continued)

(52) U.S. Cl.
CPC .......... *B42D 25/36* (2014.10); *B42D 25/305* (2014.10); *B42D 25/351* (2014.10);
(Continued)

(58) Field of Classification Search
CPC ...... B42D 25/36; B42D 25/45; B42D 25/305; B42D 25/351; B42D 25/378; G06K 19/07707; G06K 19/0723; H05B 33/12
(Continued)

(56) References Cited

U.S. PATENT DOCUMENTS

| 5,690,366 A | 11/1997 | Luciano |
| 6,530,527 B1 * | 3/2003 | Ahlers ................ B41M 3/144 235/487 |

(Continued)

FOREIGN PATENT DOCUMENTS

| CN | 1271310 | 10/2000 |
| DE | 19645084 A1 | 5/1998 |

(Continued)

OTHER PUBLICATIONS

International Search Report of PCT/EP2014/058728 dated Sep. 1, 2014.

*Primary Examiner* — Justin V Lewis
(74) *Attorney, Agent, or Firm* — Fox Rothschild LLP

(57) ABSTRACT

This invention relates to a security product or product of value (100) with a passive, electroluminescent security element (10) which includes a field-induced electroluminescent component (20) (EL component). The EL component (20) contains an electroluminescent laminate (30) disposed between two electrodes (22, 24), which at least comprises an electroluminescent dye embedded in a transparent dielectric material. The laminate (30) consists of just a single layer that directly adjoins the electrodes (22, 24). This invention further relates to an associated production method.

7 Claims, 6 Drawing Sheets

(51) Int. Cl.
  *G06K 19/077*   (2006.01)
  *G06K 19/07*    (2006.01)
  *H05B 33/12*    (2006.01)
  *B42D 25/305*   (2014.01)
  *B42D 25/378*   (2014.01)
  *B42D 25/351*   (2014.01)

(52) U.S. Cl.
  CPC ........... *B42D 25/378* (2014.10); *B42D 25/45* (2014.10); *G06K 19/0723* (2013.01); *G06K 19/07707* (2013.01); *H05B 33/12* (2013.01)

(58) Field of Classification Search
  USPC .......................... 283/72, 74, 85, 94, 98, 901
  See application file for complete search history.

(56) References Cited

U.S. PATENT DOCUMENTS

| | | | |
|---|---|---|---|
| 2008/0035736 A1* | 2/2008 | Tompkin .................. | G07D 7/00 235/488 |
| 2008/0169639 A1* | 7/2008 | Eichenberger ........... | G07D 7/02 283/85 |
| 2013/0147179 A1* | 6/2013 | Baloukas .................. | G02F 1/15 283/74 |

FOREIGN PATENT DOCUMENTS

| | | | | |
|---|---|---|---|---|
| WO | 2008143636 A1 | 11/2008 | | |
| WO | WO 2011150523 A1 * | 12/2011 | ............... | G02F 1/15 |

\* cited by examiner

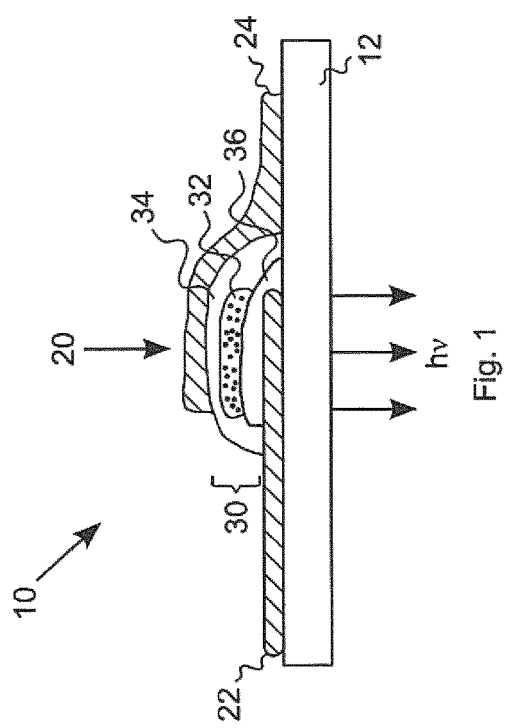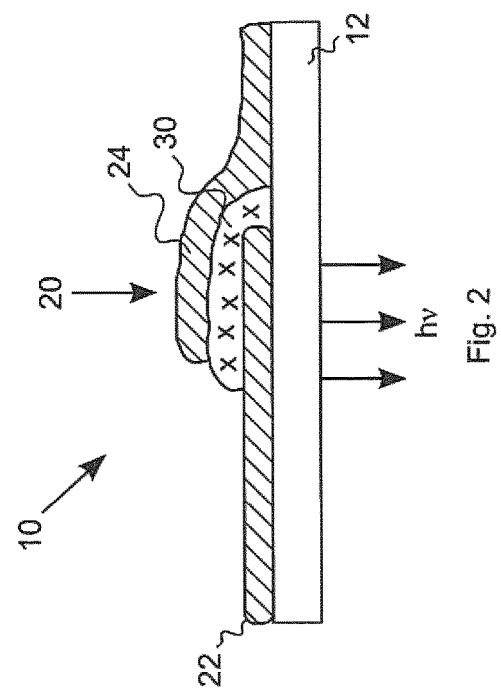

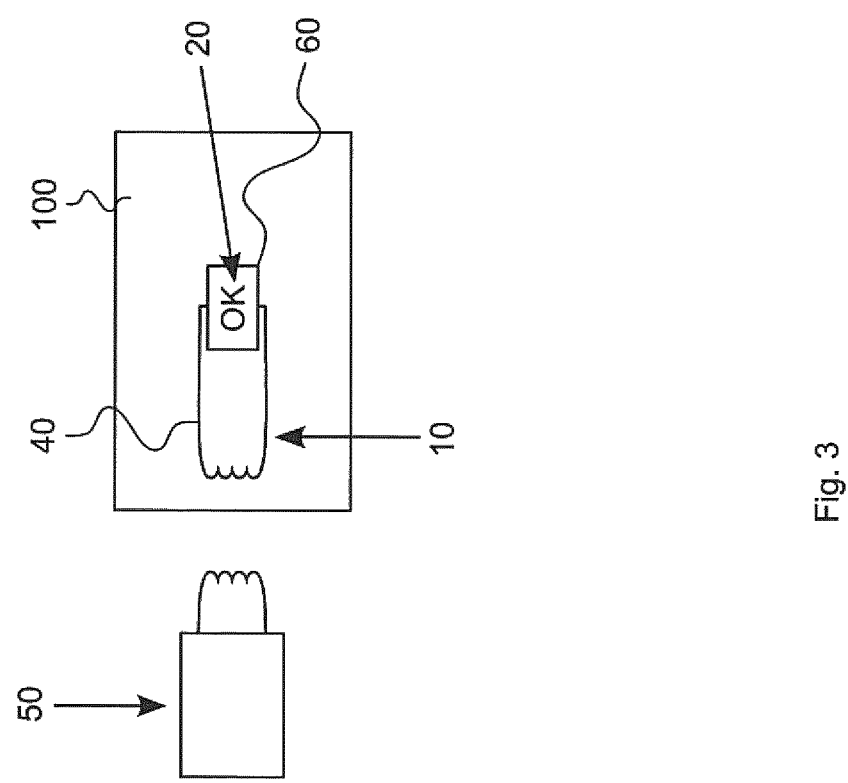

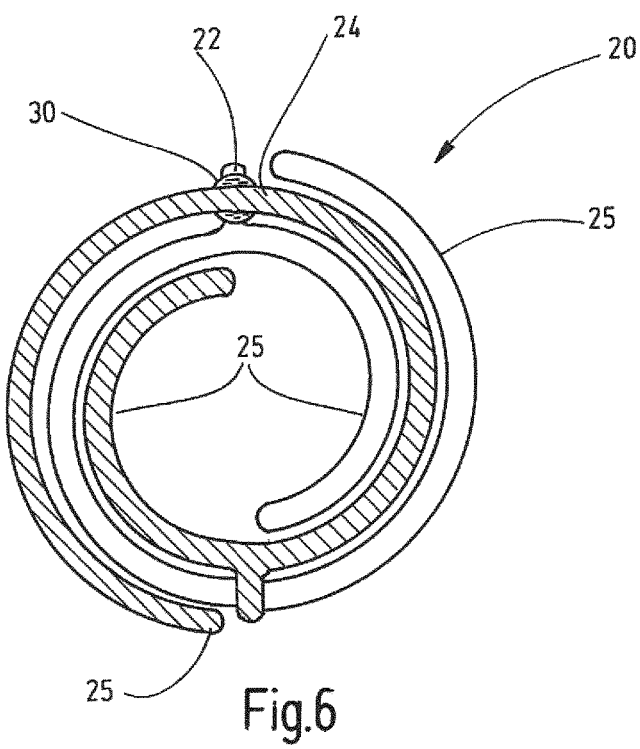
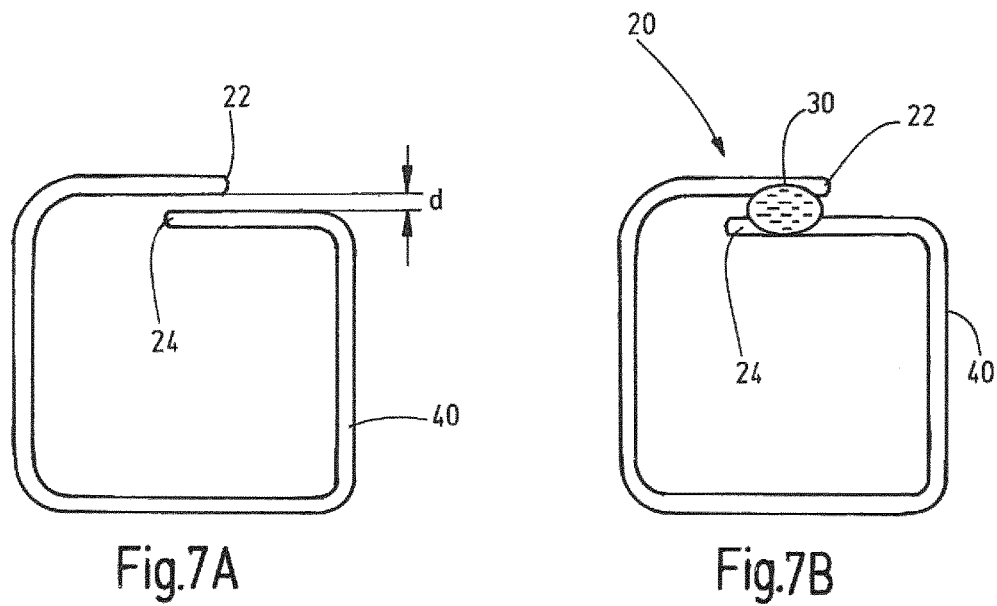

ABSTRACT

SECURITY PRODUCT OR VALUABLE PRODUCT HAVING AN ELECTROLUMINESCENT SECURITY ELEMENT AND METHOD FOR THE PRODUCTION THEREOF

CROSS-REFERENCE TO RELATED APPLICATIONS

This application is a § 371 U.S. National Stage entry of International Application No. PCT/EP2014/058728, filed Apr. 29, 2014, and claims priority to German Application No.: 10 2013 207 998.2, filed May 2, 2013, both of which are hereby incorporated herein by reference in their entireties.

This invention relates to a security product or product of value with an electroluminescent security element. This invention further relates to an associated production method.

TECHNOLOGICAL BACKGROUND

Security products and/or products of value, such as identity documents, access control cards, motor vehicle documents, bills, postage stamps, revenue stamps, visas, tickets, or bank cards typically comprise defined security features which are to make it difficult or even impossible to forge them. Security features that can be detected by humans can be divided into optical, haptic, and acoustic security features. The security and/or value documents according to the invention described in more detail below comprise an optical security element.

DE 10 2009 038 904 A1 describes products of value or security products with an electroluminescent security element that is designed as an organic light-emitting diode (OLED). The OLED described there is encapsulated in a special sandwich structure to protect it from environmental influences. OLEDs require relatively high operating voltages, however, such that either ports for an external power supply are needed or adequately dimensioned energy storage devices for supplying the operating voltage must be integrated into the security product or product of value. It should further be noted that known OLEDs are operated with direct voltage, which would require a rectifier if power supply is passive. Furthermore, OLED devices are sensitive to mechanical stresses, which limits their use in products of value and security products, especially on bills, postage stamps, and tickets. Mechanical stresses may for example cause micro cracks in the encapsulation, and since the active elements of the OLED, especially the electrode, do not have any other protective layers, penetrating water and oxygen can then reduce or completely destroy the functionality of the component. And finally, operating conventional OLEDs requires a relatively high work function, which is one of the factors determining the material selection for the electrodes.

It would therefore be advantageous to provide a security product or product of value which overcomes or at least reduces the disadvantages of prior art mentioned above.

SUMMARY OF THE INVENTION

At least some limitations of prior art can be eliminated or at least reduced using the security product or product of value with a passive, electroluminescent security element according to the invention. The electroluminescent security element comprises a field-induced electroluminescent component (EL component). The EL component contains an electroluminescent laminate disposed between two electrodes, which at least comprises an electroluminescent dye embedded in a transparent dielectric material. The laminate consists of just a single layer that directly adjoins the electrodes.

The invention is based on the finding that the use of a passive electroluminescent security element designed as a field-induced electroluminescent component is particularly suited for products of value or security products. In other words, the product of value or security product contains an EL component as an optical security element that can be inductively excited to emit light. EL components are characterized in that the electroluminescent dyes are embedded in a dielectric matrix, which means that there is no need for additional encapsulation of the entire security element. In addition, EL components can be operated with alternating current, so that simple, passive power supply can be achieved via an antenna integrated into the product of value or security product. Finally, operation of the EL components does not require very high work function voltages, which makes the selection of the electrode material considerably more variable, so that brittle materials or materials that are sensitive to oxidation or water can be left out of consideration. Such an EL component may in particular be a FIPEL (field-induced polymer electroluminescent) component in which a polymer is used as the dielectric matrix.

The EL component according to the invention contains an electroluminescent laminate disposed between two electrodes, however said layer in this case is comprised of just a single layer of a dielectric matrix with (an) embedded electroluminescent dye(s). The layer adjoins the electrodes and is thus in direct contact with the electrodes. The design of the EL component according to the invention is thus highly compact and limited to a few essential constituents, resulting in a very robust embodiment for application in value and security documents. In addition, the method of its production is also considerably simplified.

The principle of operation of a field-induced EL component, especially a FIPEL component, is known from prior art and described in detail, for example, in EP 2 078 068 B1. The EL component contains an electroluminescent laminate disposed between two electrodes, which at least includes an electroluminescent dye embedded in a transparent dielectric (polymer) material. It is common to include additives in the laminate for reinforcing the electrical field generated between the electrodes by applying a voltage.

Suitable additives in the above meaning include, in particular, carbon nanotubes (CNTs), the addition of which considerably increase the luminance of the electroluminescent dyes. Other suitable additives can be found in paragraphs [0028] to [0039] of EP 2 078 068 B1, the contents of which is completely included herein by reference.

Suitable electroluminescent dyes for the field-induced EL component include inorganic, organic, or metallo-organic compounds or quantum dots. In particular, the electroluminescent dye is an organic or metallo-organic compound as used, for example, in OLEDs for similar purposes.

Examples of suitable non-polymeric, organic, and metallo-organic dyes (so-called small molecules) include N,N-diphenylanilines and derivatives thereof, 9-H-fluorenes and derivatives thereof, anthracenes and derivatives thereof, 4,4'-bis[(9-ethyl-3-carbazoyl)-vinylenyl)]-anthracene, 9,10-bis(9-ethyl-3-carbazovinylene)-1,1'-biphenyl, 4,4'-bis(diphenylvinylenyl)-biphenyl, 1,4-bis(9-ethyl-3-carbazovinylene)-2-methoxy-5-(2-thylhexyloxy)-benzene, 4,4'-bis(diphenylvinylenyl)-anthracene, 1,4-Bis(9-ethyl-3-carbazovinylene)-9,9-dihexyl-fluorene, 9,9,9',9',9'',9''-hexakis(hexyl)-2,7',2',7''-trifluorene, analogous penta- and heptafluorenes, 9,9,9',9',9",9"-hexakis(octyl)-2,7',2',7"-trifluorene, analogous penta- and heptafluorenes, 3,7-bis-(9,9-di-n-hexylfluorene-2-yl)-dibenzothiophene-S-S-dioxide, 2,7-bis-[7-(9,9-di-n-hexylfluorene-2-yl)-dibenzothiophene-S-S-dioxide-3-yl]-9,9-di-n-hexylfluorene, tetra(2-methyl-8-hydroxyquinolinato)borate, tetra(8-hydroxyquinolinato)borate, bis(8-hydroxyquinoline)zinc, bis(2-methyl-8-hydroxyquinolin)zinc, tris(benzoylacetone)-mono(phenanthroline)europium(III), tris(benzoylmethane)mono(phenanthroline)europium(III), tris(benzoylmethane)mono(5-aminophenanthroline)europium(III), tris(dinaphthylmethane)-mono(phenanthroline)europium(III), tris(diphenylmethane)mono(phenanthroline)europium(III), tris[di(4-(2-(2-ethoxyethoxy)ethoxy)benzylmethane)]mono(phenanthroline)europium(III), tris(dibenzoylmethane) mono(4,7-diphenylphenanthroline)europium(III), bis(2-methyl-quinolinolato)(phenolato)aluminum(III) (see Y. QIU et al., J. Appl. Phys. 39:1151-1153 (2000)), tris(8-hydroxyquinolinato)aluminum(III) (see J. Kalinowski et al., Chemical Physics Letters 380(5-6):710-715 (2003)), tris(8-hydroxyquinolinato)gallium(III), platinum(III)[2-(4,6-difluorophenyl)pyridinato-N,C2)(acetyl-acetonate), iridium (III)bis(2-(4,6-difluorophenyl)pyridinato-N,C2), iridium (III)tris(2-(4-totyl)pyridinato-N,C2, iridium(III)bis(2-(2'-benzothienyl)pyridinato-NC3')(acetyl-acetonate), tris(1-phenylisoquinoline)iridium(III), bis(1-phenylisoquinoline) (acetylacetonate)iridium(III), iridium(III)bis(dibenzo[f,h]-quinoxaline) (acetylacetone), iridium(III)bis(2-methyldibenzo[f,h]-quinoxaline)(acetylacetonate), bis(2-(9,9-dibutylfluorenyl)-1-isoquinoline(acetylacetonate)iridium (III), bis(2-(9,9-dihexylfluorenyl)-1-pyridine (acetylacetonate)iridium(III), tris(3-methyl-1-phenyl-4-trimethyl-acetyl-5-pyrazoline)terbium(III), tetraphenylporphyrine, tetraphenylbutadiene, tris(2-phenylpyridine)iridium(III), derivatives of tris(2-phenylpyridine)iridium(III), which are singly or doubly methylated or halogenated, in particular, fluorinated, at any position on the phenyl ring, bis(2-phenylpyridine)iridium, platinum octaethylporphyrine, europium-tris(dibenzoylmethane)-based compounds such as europium-tris(dibenzoylmethane)-(dipyrido(3,2a-2',3'-c)phenazine), europium-tris(dibenzoylmethane)-(1,10-phenanthroline), europium-tris(dibenzoylmethane)-(2-(2-pyridyl)benzoxazole), europium-tris(dibenzoylmethane)-(2-(2-pyridyl)benzothiazole), terbium-(acetylacetone)3-(1,10-phenanthroline), dimethylphthalate (DMP), N,N-bis(4-methyl-phenyl)-4-aniline, and dyes as described in in S. Schrade, Proc. SPIE, Photonic Material and Devices, V 2003, 4991, 45.

Examples of polymeric organic dyes include poly(p-phenylene-vinylene) (PPV), alkyl-substituted, in particular, dialkyl-, such as dimethyl-, diethyl-, or dibutyl-substituted poly(p-phenylene-vinylene) derivatives (substituents in para position), poly[2-methoxy-5-(3,7-dimethyloctyloxy)-p-phenylene-vinylene] and derivatives, poly[2-methoxy-5-(2'-ethylhexyloxy)-p-phenylene-vinylene] and derivatives, polyfluorene, poly(9,9-dialkylfluorenyl-2,7-diyl) and derivatives, in particular, poly(9,9-dioctylfluorenyl-2,7-diyl), poly[9,9-di(2-ethylhexyl)-fluorene,2,7-diyl], or poly (9,9-di{2-[2-(2-methoxy-ethoxy)ethoxy]ethyl}fluorenyl-2,7-diyl) and derivatives, poly-N-vinylcarbazole, poly(p-phenylene), alkyl-substituted, in particular, 2,5-dialkyl-, such as dimethyl-, diethyl-, or dibutyl-substituted poly(p-phenylene) derivatives, poly[2-(6-cyano-6-methyl-heptyloxy)-1,4-phenylene], poly(2,5-dioctyl-1,4-phenylene) and derivatives, poly(spirofluorene), spiro(fluorene-benzofluorene), spirofluorene-based polymers as described, for example, in U.S. Pat. No. 7,524,567 B2 or H. Becker et al., Proc. SPIE 4464:49-58 (2002), poly(p-phenylene) and poly (fluorene) as described in R. Fiesel et al., Angew. Chem. 108:2233 (1996), polythiophene and derivatives as well as singly or doubly substituted copolymers in accordance with A. Holmes et al., Proc. SPIE 4464:42-48 (2002). Potential candidates for copolymers include poly[9,9-dioctyl-2,7-divinylen-fluorenylene)-alt-co(9,10-anthracene)], poly[9,9-dioctyl-2,7-divinylene-fluorenylene)-alt-co{2-methoxy-5-(2-ethylhexyloxy)-1,4-phenylene}], poly[(9,9-dioctylfluorenyl-2,7-diyl)-co-(1,4-vinylene-phenylene)], poly[(9,9-dioctylfluorenyl-2,7-diyl)-co-1,4-benzo-{2,1'-3}-thiadiazole], poly[(9,9-dihexylfluorenyl-2,7-diyl)-co-(2-methoxy-5-{2-ethylhexyloxy}-1,4-phenylene)], poly[(9,9-dihexylfluorenyl-2,7-diyl)-co-(2,5-9-xylol)], poly[(9,9-di(3,3'-N,N'-trimethylammonium)-propylfluorenyl-2,7-diyl)-alt-(9,9-dioctylfluorenyl-2,7-diyl)], poly[(9,9-dioctylfluorenyl-2,7-diyl)-co-(N,N'-diphenyl)-N,N'-di(p-butyl-oxyphenyl)-1,4-diaminobenzene)], and poly[(9,9-dioctylfluorenyl-2,7-diyl)-co-(1,4-benzo-{2,1',3}-thiadiazole)] (9:1) and derivatives.

In the context of the invention, potential materials for quantum dots are all materials which in particular comprise band gaps or exciton energies in the range from 1.5 to 3.5 eV. Typical materials include CdS, CdSe, CdTe, ZnS, ZnSe, ZnTe, HgS, HgSe, HgTe CdZnSe, CdSeS, InAs, InP, GaAs, GaP, InGaAs, InGaP, generally all semiconductor materials used in light-emitting diodes, in particular group III/IV semiconductors with the group III elements Al, Ga, and In, and the group V elements N, P, As, and Sb. Binary, ternary, quaternary (and higher complex) compounds may be formed from these elements in any combination, wherein just the molar ratio of group III elements to group V elements should be 1:1. All materials mentioned may be doped with atoms that do not belong to any of the groups of elements mentioned. In addition, core-shell particles such as CdSe/ZnS may be used. Other materials include phosphorus nanoparticles doped with a rare earth element. Various Cd-free quantum dots are available, for example, from Nanoco Technologies Ltd., Manchester, UK, Strem Chemicals Inc., or from Aldrich Materials Science.

Other examples of suitable dyes can be found in paragraphs [0040] to [0045] of EP 2 078 068 B1, the contents of which is completely included herein by reference.

The electroluminescent dye is preferably selected such that a HOMO/LUMO gap in the range from 1.5 to 3.5 eV is obtained. This facilitates passive operation of the EL component. Voltages for operating the EL component, especially the FIPEL component, are preferably in the range from $10^6$ to $10^8$ V/m.

The dielectric matrix in which the dye and the optional additive are embedded is a transparent dielectric material, especially a polymer. Examples of suitable polymeric materials include polyvinyl fluoride (PVF), polytetrafluoroethylene (PTFE), and polymethacrylate (PMA), polycarbonate (PC), especially bisphenol A-polycarbonate, polyethylene terephthalate (PET), their derivatives, such as glycol-modified PET (PETG), polyethylene naphthalate (PEN), polyvinyl chloride (PVC), polyvinyl butyral (PVB), polymethylmethacrylate (PMMA), polyimide (PI), polyvinyl alcohol (PVA), polystyrene (PS), polyvinyl phenol (PVP), polypropylene (PP), polyethylene (PE), thermoplastic elastomers (TPE), especially thermoplastic polyurethane (TPU), acrylnitrile-butadiene-styrene copolymer (ABS) and derivatives thereof. Other suitable matrix materials can be found in paragraph [0049] of EP 2 078 068 B1 and in EP 0 688 839

A2, in the latter especially the binding agent according to formula (I), the contents of which patent specifications being fully included herein.

Metals, metal oxides, conductive carbon-containing materials, and conductive polymers may be used as electrode materials and materials for the other components of the circuit (conductor tracks, antenna, etc.). Particularly suitable metals include Au, Ag, Al, and Cu. Transparent metal oxides such as indium tin oxide (ITO), indium zinc oxide (IZO), indium antimony oxide (IAO), antimony-doped indium oxide, antimony-doped indium tin oxide (IATO), and antimony-doped tin oxide (ATO) are particularly suited for producing transparent electrodes and conductor tracks. Graphites or carbon black are particularly preferred as carbon-containing materials. Conductive polymers include in particular polyaniline (PANI) and, particularly preferred, poly-3,4-ethylene dioxythiophene polystyrene sulfonate (PEDOT:PSS). Printable solutions/suspensions can be produced from the materials mentioned (in particular by using nanoscale materials). Conductive polymers are particularly preferred because they show low brittleness and are printable.

The materials used for the EL component, i.e., in particular, the dye, the additive, the electrodes, the printed circuit board, and the dielectric matrix are preferably selected based on their printability.

The security element further includes an antenna that is embedded in the security product or product of value and has an electrically conductive connection to the electrodes. It is preferred, however, that the electrodes themselves have a are geometrical design such that they can act as antennas—the electrodes thus are an integral part of the antenna. According to another preferred embodiment of the invention, the antenna and the EL component are disposed on the same substrate but do not have an electrically conductive interconnection. The antenna and the EL component however comprise contact surfaces that adjoin in a second state an thereby make an electrical connection. The switch from the first to the second state may be initiated, for example, by folding the substrate, e.g. a bill, at a defined location. An excitation frequency of the antenna may be predetermined freely and will substantially depend on the actual design of the EL component, i.e. the structure of the laminate and the materials selected for the dielectric matrix, electroluminescent dye, electrodes, and additive. It is particularly preferred that the EL component and the antenna are configured such that an excitation frequency of the antenna meets an RFID standard. The inductance L of the antenna and the capacitance C of the EL component form a resonant circuit here. The resonant frequency of this parallel resonant circuit can be calculated in a simplified way by:

$$fres = \frac{1}{2 \cdot \pi \cdot \sqrt{L \cdot C}} ..$$

Components should preferably be dimensioned such that the resonant frequency of the resonant circuit matches the excitation frequency of the excitation source. In this way, excitation sources that are already established in the market can be used. It also eliminates the need for additional diodes or rectifier components to operate the security element. Known RFID tags work in the long-wave band at 125 to 134 kHz, the short-wave band at 13.56 MHz (e.g. NFC protocol), the UHF band at 865-869 MHz (European frequencies) or 950 MHz (U.S. and Asian frequency bands), respectively, or the SHF band at 2.54 GHz and 5.8 GHz. In other words, energy can be supplied contactless in accordance with the known RFID method wherein the coupling is performed by a short-range alternating magnetic field generated by a reader or by high-frequency radio waves. Examples of how such a coupling can be implemented in security products and products of value can be found, for example, in DE 10 2010 003 853 A1.

According to another preferred embodiment of the invention, the dye is disposed in the laminate of the EL component according to a predeterminable pattern. In other words, the dye in the laminate is structured. This is a simple way to display symbols and other information. Alternatively, a light-emitting section of the EL component is covered with an additional structured masking. The light emitted by the laminate is thus partially shielded by the masking, which is another simple way to represent symbols and information by means of the structuring. In an improvement of the embodiment mentioned last, one of the electrodes themselves provides the masking. In other words, there is no need for an additional masking; instead, a non-transparent electrode is structured for displaying symbols or information.

Products of value or security products according to the invention include, for example, passports, identity cards, driver licenses, access control cards or other ID cards, vehicle identification cards, vehicle registration documents, visas, checks, means of payment, especially bills, checks, bank, credit, or cash cards, customer cards, health insurance cards, chip cards, corporate identification cards, credentials, membership cards, gift cards or shopping coupons, bills of lading, revenue stamps, postage stamps, tickets, (gaming) chips, deeds or adhesive labels (e.g. for product assurance). Use in bills and visas is preferred. The electroluminescent security element used according to the invention may for example be designed as a sticker, label, or the like that can be inseparably joined to an intermediate product of the product of value or security product to form the product of value or security product. The security element can preferably be implemented on a plastic patch, such as a holographic strip or patch.

The security element may have a square shape. In this case, it is preferred that the size of the security element is from 1 mm×1 mm to 100 mm×100 mm, particularly preferred from 7 mm×7 mm to 12 mm×12 mm, for example, 10 mm×10 mm. Round, oval, rectangular, star-shaped, or other shapes are also possible. The largest dimension of the security element preferably is 1 mm to 100 mm, particularly preferably 7 mm to 12 mm, and the smallest dimension preferably is 1 mm to 100 mm, particularly preferably 7 mm to 12 mm.

The product of value or security product may in particular be a smart card. The product of value or security product may further be in ID-1, ID-2, ID-3, or another standardized or non-standardized format, such as in booklet form like a passport-like object, or in card form. Products of value or security product often are laminates of multiple document layers which were joined evenly in an exact fit under heat and increased pressure. These products should in particular meet the requirements of the standards, preferably of ISO 10373, ISO/IEC 7810, and ISO 14443. The document layers in particular consist of a substrate material suitable for lamination.

The product of value or security product may be produced completely or in part based on a polymer selected from the group comprising polycarbonate (PC), especially bisphenol A polycarbonate, polyethylene terephthalate (PET), their derivatives, such as glycol-modified PET (PETG), polyethylene naphthalate (PEN), polyvinyl chloride (PVC), polyvinyl butyral (PVB), polymethylmethacrylate (PMMA), polyimide (PI), polyvinyl alcohol (PVA), polystyrene (PS), polyvinyl phenol (PVP), polypropylene (PP), polyethylene (PE), thermoplastic elastomers (TPE), especially thermoplastic polyurethane (TPU), acrylnitrile-butadiene-styrene copolymer (ABS) and derivatives thereof, and/or paper and/or cardboard and/or glass and/or metal and/or ceramic. In addition, the product may be made of several of these materials. It preferably consists of PC or PC/TPU/PC. Common additives may be added to the polymers, especially dispersing agents, dyes, and stabilizers. The product may further comprise a protective coat or topcoat. The product is preferably made of 3 to 12, preferably of 4 to 10 document layers/films, individual layers/films of which may be printed on. A laminate formed in this way may finally be coated with a protective or topcoat on one or both sides. These overlay coats protect a security feature disposed underneath and/or give the document the required abrasion strength. The security feature is preferably disposed on one of the inner layers/films. An example of a printing method for producing a polycarbonate laminate for a product of value or security product can be found in DE 10 2007 052 947 A1.

Another aspect of the invention is related to a method for producing the security product or product of value described above. The method is characterized in that the EL component is produced using a printing process. Common printing methods such as screen printing may be used. An example of a product of value or security product made using a printing method can again be found in DE 10 2007 052 947 A1. In particular, the laminate of the EL component can be produced using the method described therein. The materials required for producing the parts of the EL component are provided as ink which is applied in the printing process using a printing plate.

BRIEF DESCRIPTION OF THE FIGURES

The invention is explained in greater detail with reference to embodiments and the associated drawings below. Wherein:

FIG. 1 shows a schematic sectional view of a passive electroluminescent security element with a field-induced EL component that is not within the scope of this invention;

FIG. 2 shows a schematic sectional view of a passive electroluminescent security element with a field-induced EL component according to one embodiment of this invention;

FIG. 3 shows a security product or product of value with a passive electroluminescent security element according to the invention;

FIGS. 4A to 4C, 5A to 5C, 6, 7A, 7B, 8, and 9 show other embodiments of the passive electroluminescent security element according to the invention.

DETAILED DESCRIPTION OF THE INVENTION

Figure 4C:
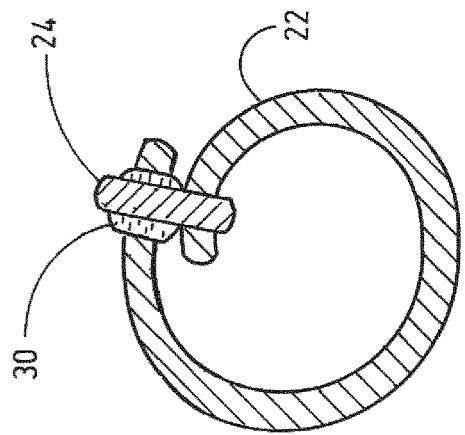

FIG. 1 shows—in a highly schematic manner—a sectional view of an electroluminescent security element 10 of a product of value or security product, the design of the EL component of which is not within the scope of this invention. The security element 10 is disposed on a substrate 12, which is a part of the security product or product of value not shown here. According to this embodiment, the substrate 12 consists of a transparent material through which light passively generated in the security element 10 is emitted.

The security element 10 comprises a field-induced polymeric electroluminescent component 20 (FIPEL component). The latter contains a transparent electrode 22 on the side facing the substrate 12 and another counter-electrode 24 which can optionally be configured to be transparent. An electroluminescent laminate 30 is arranged between the two electrodes 22, 24. The laminate 30 contains a sublayer 32 made of a transparent dielectric polymer material in which an electroluminescent dye with additives that amplify the electrical field is embedded. The laminate 30 includes to other sublayers 34, 36 made of a transparent dielectric polymer material, which shield the sublayer 32 from the electrodes 22, 24. When an alternating voltage is applied, light is generated in the sublayer 36 that is emitted at least via the transparent sublayer 36 and the transparent electrode 22 as well as the transparent substrate 12.

FIG. 2 shows an embodiment according to the invention of a FIPEL component 20, again in a highly schematic sectional view. Only the laminate 30 between the two electrodes 22 and 24 differs from the embodiment shown in FIG. 1. The laminate 30 only consists of one layer (ply) of a dielectric polymer material in which the electroluminescent dye and an optional additive are embedded.

Exemplary Embodiment—manufacture of a FIPEL Component

The FIPEL component according to this embodiment included a first transparent electrode made of ITO, a second electrode made of gold, and a laminate disposed between the two electrodes. The two electrodes were printed in a generally known way by depositing inks with nanoscale particles of the electrode material. First, an ink containing indium tin oxide was printed onto a transparent substrate of polycarbonate to produce the first electrode. Then the laminate was applied onto the first electrode, once again using a printing process. Finally, an ink containing gold particles was used to produce the second electrode in a printing process. The two electrode layers can also be deposited using a conventional process, e.g. ITO by sputtering and gold by thermal evaporation.

The laminate was produced based on a dielectric transparent polymer material—in this case, a polycarbonate derivative. An electroluminescent substance was embedded in the transparent polymer material.

A mixture of 17.5 wt % of the polycarbonate derivative (a mixture of 149.0 g (0.65 mol) bisphenol A (2,2-bis-(4-hydroxyphenyl)-propane and 107.9 g (0.35 mol) 1,1-bis-(4-hydroxyphenyl)-3,3,5-trimethylcyclohexane) and 82.5 wt % of a solution according to the table below was prepared:

| Component | wt % |
|---|---|
| Mesitylene (1,3,5-trimethylbenzene) | 2.40 |
| 1-Methoxy-2-propanol acetate | 34.95 |
| Mesitylene (1,2,4-trimethylbenzene) | 10.75 |
| Ethyl-3-ethoxypropionate | 33.35 |
| Cumene | 0.10 |
| Solvent naphtha | 18.45 |

10 wt % of a solution of the electroluminescent substance (2.5 wt % iridium(III)tris(2-(4-totyl)pyridinato-N,C2) in toluene) were added under stirring to 90 wt % of this mixture. The ink obtained was applied in a screen printing process to produce the laminate. Homogeneous layer thicknesses of about 1 μm were achieved.

FIG. 3 shows a specific embodiment of a security product or product of value according to the invention. The security product or product of value 100 is designed as a smart card and contains the passive electroluminescent security element 10 with a FIPEL component 20, an example of which is described in FIG. 2 and/or the detailed design of which can be in accordance with the previous embodiment. The security element 10 further comprises an antenna 40 to which the two electrodes of the FIPEL component are connected. The antenna 40 is excited using a suitable reader 50 and the voltage required for operating the FIPEL component 20 is induced. The electroluminescent laminate of the FIPEL component 20 forms the capacitance and the electrodes acting as antennas form the inductance.

The light-emitting section of the FIPEL component 20 comprises an additional masking 60 for structuring the light emission such that, for example, the word "OK" is illuminated and displayed when the electroluminescent security element 10 is activated.

Figure 4B:
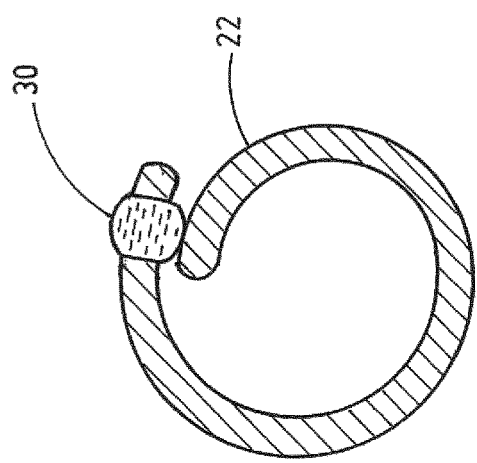
Figure 4A:
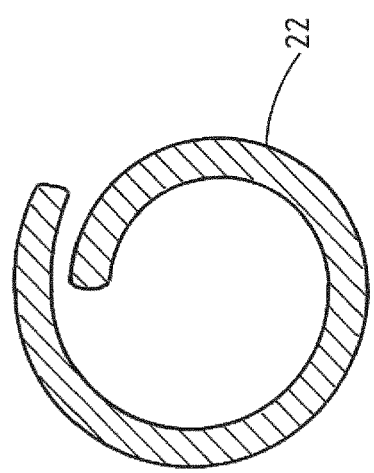

FIGS. 4A to 4C show three partial views of process steps to produce a security element. The first electrode 22 shown in FIG. 4A has an open annular contour with one turn. According to this embodiment, the first electrode 22 at the same time represents an antenna loop and thus the inductance. In other words, there is no need for a separate antenna in this case. The first electrode 22 may consist of ITO.

Then the electroluminescent laminate 30, which here consists of just a single layer of a dielectric matrix, such as a PVK/PS matrix, with an embedded electroluminescent dye, such as IrPPy3 is applied onto the first electrode 22 (FIG. 4B).

Finally, the second electrode 24, which may be made of silver, for example, is applied onto the laminate 30 (FIG. 4C). The component may also be built in reverse order, starting with the second electrode 24. In this case, the electrode 24 may, for example, consist of ITO and the electrode 22 may consist of silver.

Figure 5C:
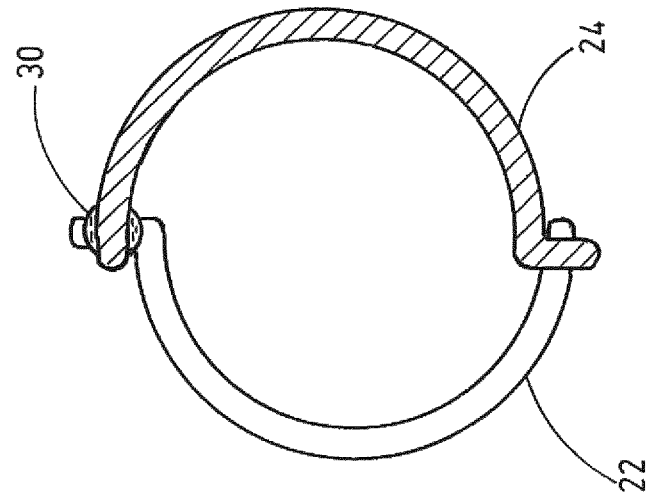
Figure 5B:
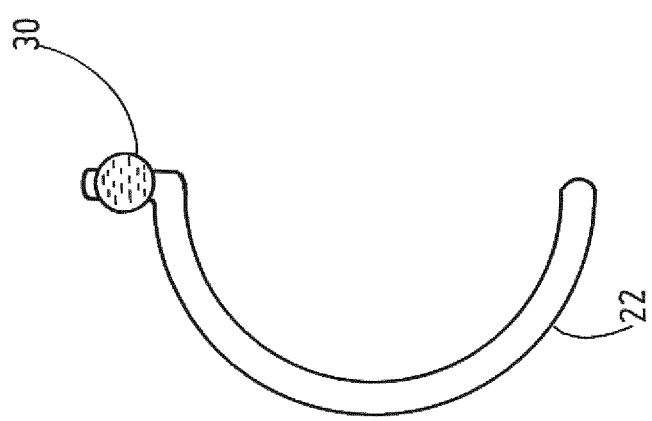
Figure 5A:
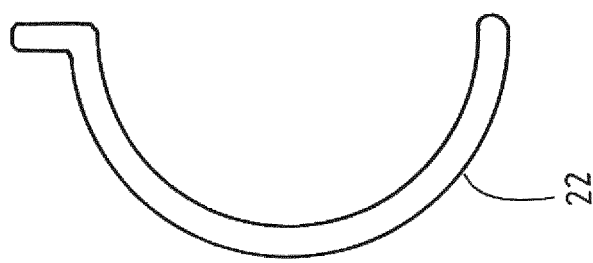

FIGS. 5A to 5C also show three partial views of process steps to produce a security element. The component is produced using a similar method as shown in FIGS. 4A to 4C. The two electrodes 22, 24 each form a semicircle which add up to a coil with one turn. Once again the two electrodes 22, 24 act as an antenna.

FIG. 6 shows an EL component 20 of a security element in which the two electrodes 22, 24 comprise additional blind turns 25. These blind turns 25 increase the capacitance of the resonant circuit and thus reduce the inductance required to reach the resonant frequency and for optimum energy induction.

FIGS. 7A and 7B show another embodiment of an EL component 20 for which the production method has been further simplified. The EL component 20 is produced in just two process steps here: the electrodes are applied in a first step (FIG. 7A) and the laminate is applied in a second step (FIG. 7B). The electroluminescent laminate 30 is not covered at the top and bottom by electrodes 22, 24; instead, the laminate 30 is directly deposited onto the electrodes 22, 24. This means that the conductor ends of the annular antenna 40 form the electrodes 22, 24. A short distance d between the electrodes 22, 24 in the range from 100 nm to 1000 nm is required. The laminate 30 between the electrodes 22, 24 once again forms the capacitance of the EL component 20.

Figure 8:
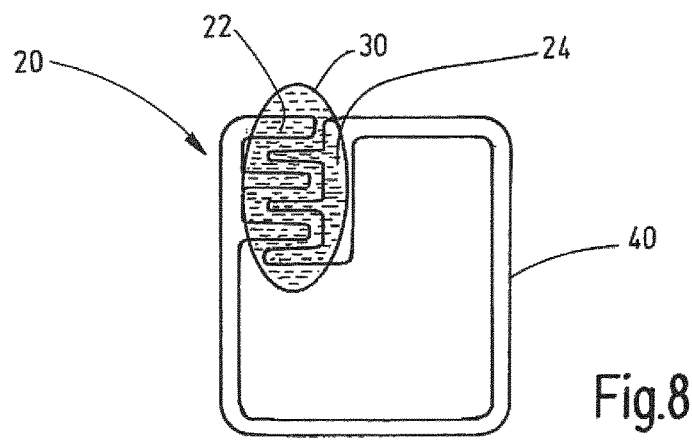

FIG. 8 shows a development of the embodiment of the EL component 20 shown in FIG. 7B. The two electrodes 22, 24 have a comb-like contour and engage in one another, forming a narrow, meandering channel. The channel is between 10 nm and 1000 nm in width. This increases the luminous area and the required capacitance compared to the embodiment shown in FIG. 7B.

Figure 9:
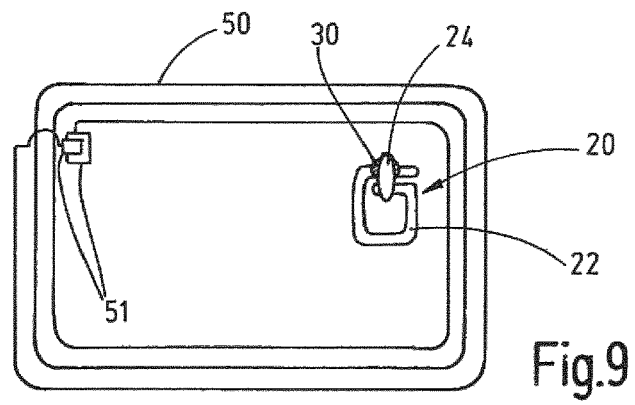

An additional booster antenna 50 with two contact surfaces 51 that act as electrodes may be used to further increase the energy induced in the EL component 20 (FIG. 9). In the unfolded state shown, the two contact surfaces 51 of the booster antenna 50 form a capacitor. The EL component 20 comprises complementary contact surfaces on its electrodes 22, 24. After folding, the contact surfaces 51 of the booster antenna 50 are adjacent to the contact surfaces of the EL component 20 and thus establish an electrical connection of the components. The booster antenna 50 helps to make the security element glow brighter or allows a longer distance from the reader.

Figure 10:
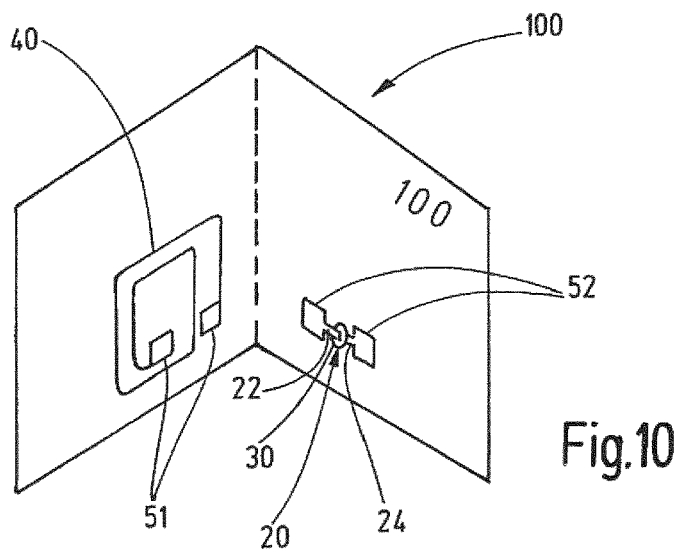
FIG. 10 shows a bill with another variant of the passive electroluminescent security element according to the invention.

FIG. 10 shows a bill 100 with a passive security element in which the antenna 40 and the EL component 20 are spaced apart on the substrate. The antenna 40 and the electrodes 22, 24 comprise a complementary arrangement of contact surfaces 51, 52. The antenna 40, electrodes 22, 24, and contact surfaces 51, 52 can be created in a joint manufacturing step. The geometric design of the antenna 40 can thus be much more independent of the position of the EL component 20, which as a rule allows more turns of the antenna. The circuit of the EL component 20 is only closed when the bill is folded and can be activated by holding it close to a reader. The respective contact surfaces 51, 52 provide an electrical connection of the antenna 40 and the EL component 20. This effectively prevents unintended lighting up and potential degradation of the EL component 20.

The invention claimed is:

1. A security product or product of value (100) with a passive, electroluminescent security element (10) which includes a field-induced electroluminescent component (20), wherein the electroluminescent component (20) contains only an electroluminescent layer (30) disposed between two layered electrodes (22, 24), the electroluminescent layer comprising a mixture of at least one electroluminescent dye embedded in a transparent dielectric material, characterized in that the electroluminescent layer (30) directly adjoins and contacts the electrodes (22, 24), and electroluminescent dye embedded in the transparent dielectric material is positioned between the electrodes (22, 24).

2. The security product or product of value (100) according to claim 1, wherein the security element (10) further includes an antenna (40) that is embedded in the security product or product of value (100) and has an electrically conductive connection to the electrodes (22, 24).

3. The security product or product of value (100) according to claim 1, wherein the electrodes are configured to act as antennas.

4. The security product or product of value (100) according to claim 1, wherein the electroluminescent dye is an organic or metallo-organic compound.

5. The security product or product of value (100) according to claim 1, wherein the electroluminescent dye is arranged in the laminate (30) in accordance with a pattern.

6. The security product or product of value (100) according to claim 1, wherein a light-emitting section of the EL component (20) is covered by a structured masking (60).

7. The security product or product of value (100) according to claim 1, wherein the EL component (20) is a FIPEL component.

* * * * *